(12) United States Patent
Quinlan et al.

(10) Patent No.: US 12,381,740 B2
(45) Date of Patent: Aug. 5, 2025

(54) WEB BROWSER GENERATION OF UNIQUE IDENTIFIERS

(71) Applicant: Wells Fargo Bank, N.A., San Francisco, CA (US)

(72) Inventors: Michael J. Quinlan, San Francisco, CA (US); Ajit Gaddam, Danville, CA (US)

(73) Assignee: Wells Fargo Bank, N.A., San Francisco, CA (US)

( * ) Notice: Subject to any disclaimer, the term of this patent is extended or adjusted under 35 U.S.C. 154(b) by 152 days.

(21) Appl. No.: 18/489,604

(22) Filed: Oct. 18, 2023

(65) Prior Publication Data

US 2025/0106040 A1 Mar. 27, 2025

Related U.S. Application Data

(60) Provisional application No. 63/585,845, filed on Sep. 27, 2023.

(51) Int. Cl.
H04L 9/32 (2006.01)

(52) U.S. Cl.
CPC .................................. *H04L 9/3247* (2013.01)

(58) Field of Classification Search
CPC ... H04L 9/3247; H04L 9/3234; H04L 9/3263; G06F 21/53; G06F 21/74
See application file for complete search history.

(56) References Cited

U.S. PATENT DOCUMENTS 11,695,549 B2 * 7/2023 Damiano .............. H04L 9/0891
    713/171
11,907,362 B2 * 2/2024 Grobman ................ G06F 21/74
(Continued)

FOREIGN PATENT DOCUMENTS

WO    WO-2020143906 A1 *   7/2020  ............. G06F 21/44

OTHER PUBLICATIONS

S. Eskandarian et al., "Fidelius: Protecting User Secrets from Compromised Browsers," 2019 IEEE Symposium on Security and Privacy (SP), San Francisco, CA, USA, 2019, pp. 264-280. (Year: 2019).*

(Continued)

*Primary Examiner* — Kari L Schmidt
(74) *Attorney, Agent, or Firm* — SCHWEGMAN LUNDBERG & WOESSNER, P.A.

(57) ABSTRACT

A method may include transmitting, from a browser application of a client system, a request for a webpage to a server system using a general execution environment of the client system; receiving the webpage, the webpage including a secure execution request to execute a computation in a trusted isolated execution environment of the client system; in response to the secure execution request, establishing a secure enclave within the trusted isolated execution environment with respect to the browser application; receiving, within the trusted isolated execution environment, an attestation request from the server system for an attestation associated with the secure enclave; transmitting, from the trusted isolated execution environment, an attestation response based on a physical property of a processing unit in the client system; subsequent to transmitting the attestation response, receiving, from the server system, a data file; and storing the data file in the secure enclave.

20 Claims, 4 Drawing Sheets

(56) References Cited

U.S. PATENT DOCUMENTS

| | | | |
|---|---|---|---|
| 2014/0173709 A1* | 6/2014 | Eldar | G06F 21/74 726/7 |
| 2016/0156666 A1* | 6/2016 | Rajagopal | G06F 21/44 726/1 |
| 2020/0076829 A1* | 3/2020 | Wentz | H04L 63/0823 |
| 2020/0259799 A1* | 8/2020 | Li | H04L 9/0897 |
| 2021/0049716 A1* | 2/2021 | Li | G06F 9/54 |
| 2021/0240818 A1* | 8/2021 | Seksenov | G06F 16/986 |
| 2021/0266329 A1* | 8/2021 | Fuhry | G06F 21/604 |
| 2021/0397698 A1* | 12/2021 | Li | H04L 9/3263 |
| 2022/0321354 A1* | 10/2022 | Ladd | H04L 9/3247 |
| 2023/0269093 A1* | 8/2023 | Ben-Ari | H04L 63/126 713/175 |
| 2024/0086520 A1* | 3/2024 | Kaplan | G06F 21/53 |
| 2025/0097051 A1* | 3/2025 | Luo | H04L 9/0897 |

OTHER PUBLICATIONS

Gianluca Scopelliti, Sepideh Pouyanrad, Job Noorman, Fritz Alder, Christoph Baumann, Frank Piessens, and Jan Tobias Mühlberg. 2023. End-to-End Security for Distributed Event-driven Enclave Applications on Heterogeneous TEEs. ACM Trans. Priv. Secur. 26, 3, Article 39 (Aug. 2023), 46 pages. (Year: 2023).*

* cited by examiner

WEB BROWSER GENERATION OF UNIQUE IDENTIFIERS

RELATED APPLICATIONS

This patent application claims the benefit of U.S. Provisional Patent Application No. 63/585,845, titled "WEB BROWSER GENERATION OF UNIQUE IDENTIFIERS" filed Sep. 27, 2023, which is herein incorporated by reference in its entirety

BACKGROUND

Web applications and online service providers face significant challenges in uniquely identifying client devices and users, as modern web browsers prioritize user privacy and anonymity. Browsers have implemented features that make device fingerprinting and tracking users across sites difficult. For example, browsers limit access to system hardware information, automatically clear cookies, and allow users to easily switch between identities and accounts. While increased privacy protection benefits consumers, it enables fraudulent actors to more easily create fake accounts, log in from multiple devices, and evade detection.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawing.

DETAILED DESCRIPTION

In the following description, for purposes of explanation, numerous specific details are set forth in order to provide a thorough understanding of some example embodiments. It will be evident, however, to one skilled in the art that the present invention may be practiced without these specific details.

Throughout this disclosure, electronic actions may be performed by components in response to different variable values (e.g., thresholds, user preferences, etc.). As a matter of convenience, this disclosure does not always detail where the variables are stored or how they are retrieved. In such instances, it may be assumed that the variables are stored on a storage device (e.g., Random Access Memory (RAM), cache, hard drive) accessible by the component via an Application Programming Interface (API) or other program communication method. Similarly, the variables may be assumed to have default values should a specific value not be described. User interfaces may be provided for an end-user or administrator to edit the variable values in some instances.

In various examples described herein, user interfaces are described as being presented to a computing device. Presentation may include data transmitted (e.g., a hypertext markup language file) from a first device (such as a web server) to the computing device for rendering on a display device of the computing device via a web browser. Presenting may separately (or in addition to the previous data transmission) include an application (e.g., a stand-alone application) on the computing device generating and rendering the user interface on a display device of the computing device without receiving data from a server.

Web-based services and applications have become ubiquitous in modern life. Individuals rely on web applications to access email, conduct financial transactions, store sensitive documents, and manage various accounts. However, the anonymity afforded by web browsers has made it challenging for service providers to cryptographically verify the identity of the client device and user behind requests. Malicious actors exploit this lack of device identification to compromise user accounts through fraudulent account creation, account takeover, scraping of sensitive data, and deployment of bots.

For example, a fraudster may use anonymizing browsers and privacy tools to disguise their identity and location while programmatically opening thousands of fake accounts on a service. Without a means to cryptographically attest the uniqueness of the requesting device, the service provider has no way to link the account creation requests to a single bad actor.

Similarly, an attacker who gains access to a user's login credentials can stealthily take over the account by logging in from an anonymous network halfway across the world. The legitimate user may have no indication their account is compromised. The service provider may struggle to detect the account takeover since the request has valid authentication. Enabling services (e.g., web application) to reliably identify the specific device making requests would allow easier detection of patterns of fraudulent activity thereby mitigating threats from fake account creation, account takeover, scraping attacks, and malicious bots.

System and methods described herein use trusted isolated execution environment (TEE) capabilities available in modern computer processors to enable web applications to cryptographically identify client devices that make requests. A TEE provides an isolated execution context that protects secrets and computations from the rest of the client system—and even other parts of an application that initiates the TEE. In various examples, TEEs rely on processor features such as Intel SGX and AMD Secure Encrypted Virtualization that utilize hardware-embedded cryptographic keys unique to each CPU.

A browser enabled with TEE capabilities may allow received web applications to invoke cryptographic operations within the TEE. For example, when a user attempts to register an account using a web application of a service provider, the service provider's website may trigger an application programming interface (API) call to invoke the TEE and generate a unique identifier using CPU-specific secret keys. This identifier cryptographically attests that the account creation originated from a particular device. The service provider may then analyze registration patterns to detect and block fraudulent account calls.

The TEE may also be provisioned with secrets such as authentication cookies by the service provider. The cookies may be decrypted and utilized only within the protected TEE context, preventing cookie theft. Even if an attacker steals a user's cookie, it would be evident that use of the cookie would be coming from a different client system—thus enabling detection of account takeover.

As described herein, the TEE-based identification may integrate with web technologies like JavaScript and may not require any special client software. Users may opt-in to activate the TEE features when accessing sensitive accounts, maintaining privacy. Other benefits of using a TEE with a web browser may be evident to those having ordinary skill in the art.

Figure 1:
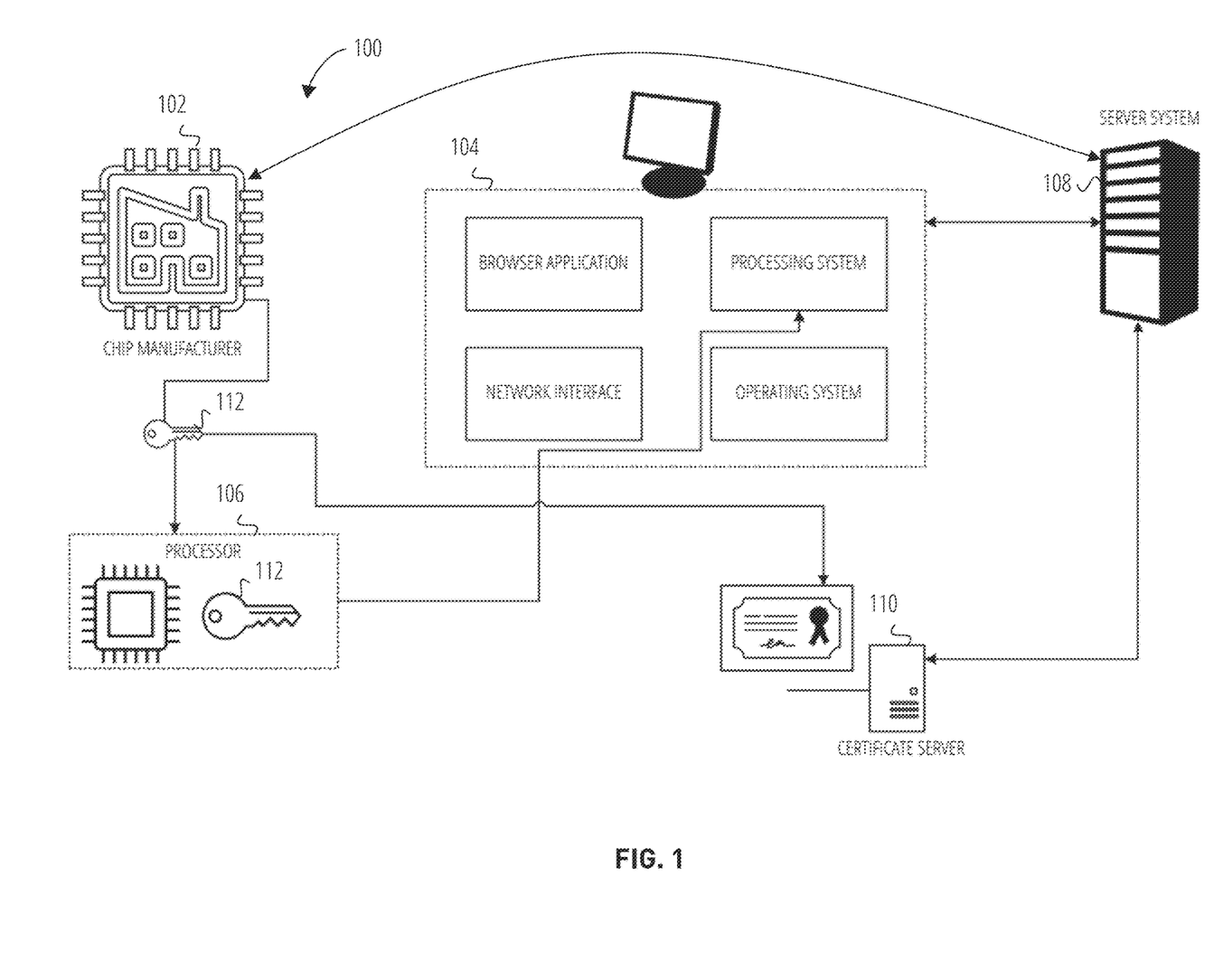
FIG. 1 is a network architecture schematic diagram, according to various examples.

FIG. 1 is a network architecture schematic diagram, according to various examples. Diagram 100 includes chip manufacturer 102, client system 104, processor 106, server system 108, certificate server 110, and hardware tied private key 112. Diagram 100 is an example environment in which a trusted isolated execution environment may be deployed on a client device (e.g., client system 104) and used by a web application. In various examples, chip manufacturer 102 may design and manufacture processors, such as processor 106. The manufacturing process may embed, within a processor, a unique identifier such as a unique hardware-tied private key in each processor. Within diagram 100, this key is presented as hardware tied private key 112.

The embedding may occur during a "burn in" process during manufacturing. For example, these keys may be written to non-volatile, write-once-read-many (WORM) memory so they cannot be changed after manufacturing. In other examples, the unique electrical characteristics of individual semiconductor components, like resistors or transistors, can be used as a source of unique identifiers or keys. For discussion purposes, the use of "embedding" a key also includes the scenarios in which a key is derived from these unique electrical characteristics. Hardware tied private key 112 may comprise a cryptographic hash or symmetric encryption key randomly generated for each processor. Chip manufacturer 102 may securely store information about each hardware tied private key 112, such as its value and which processor 106 it corresponds to.

In various examples, verification parameters such as a certificate may also be embedded with the processor that includes the public key that was provisioned with the embedded private key. The hardware tied private key 112 and verification parameters may also be securely transmitted to certificate server 110. These verification parameters may allow certificate server 110 to later cryptographically attest the authenticity of the hardware tied private key 112 on a particular processor, such as processor 106 as part of processing system of client system 104.

Client system 104 may be a computing device such as, but not limited to, a smartphone, tablet, laptop, multi-processor system, microprocessor-based or programmable consumer electronics, game console, set-top box, or other device that a user utilizes to communicate over a network. In various examples, a computing device includes a display module (not shown) to display information (e.g., in the form of specially configured user interfaces). In some embodiments, computing devices may comprise one or more of a touch screen, camera, keyboard, microphone, or Global Positioning System (GPS) device.

Client system 104 is illustrated as including a processing system along with a browser application, a network interface, and an operating system. The processing system may execute on a processor such as processor 106. In various examples, a general execution environment of the processing system is used for the standard operating system, drivers, libraries, and applications. The general execution environment may be untrusted and insecure—as compared to a trusted isolated execution environment—and is accessible to any software running on client system 104.

The processing system may also include a trusted isolated execution environment (TEE) for executing attestable code and protecting sensitive data. The TEE may isolate code and data from the general environment using encrypted memory enforced by security key 112. Thus, the TEE operations may access sealed data and keys inaccessible in the general execution environment.

Client system 104, certificate server 110, server system 108, and chip manufacturer 102 may communicate over a network (not shown). The network may include local-area networks (LAN), wide-area networks (WAN), wireless networks (e.g., 802.11 or cellular network), the Public Switched Telephone Network (PSTN) Network, ad hoc networks, cellular, personal area networks or peer-to-peer (e.g., Bluetooth®, Wi-Fi Direct), or other combinations or permutations of network protocols and network types. The network may include a single Local Area Network (LAN) or Wide-Area Network (WAN), or combinations of LAN's or WAN's, such as the Internet.

A user of client system 104 may use a web browser (e.g., browser application) on client system 104 to connect over network interface to an external systems like server system 108 to access a website. Server system 108 may include a webserver and transmit a webpage that is rendered on the browser application of client system 104. As described in more detail further herein, the browser application may be a TEE-enabled application and include the ability to initialize a secure enclave for executing within the TEE.

Once initiated, the secure enclave may be isolated not only from the operating system, but also from other processes of the browser application. A webpage served from server system 108 may include JavaScript API calls to interact with the secure enclave. The API call may also trigger an attestation by requesting the certificate server 110 validate verification parameters passed to server system 108 from the TEE. Therefore, the server system 108 may confirm client system 104 has an authentic TEE before transmitting sensitive data.

Figure 2:
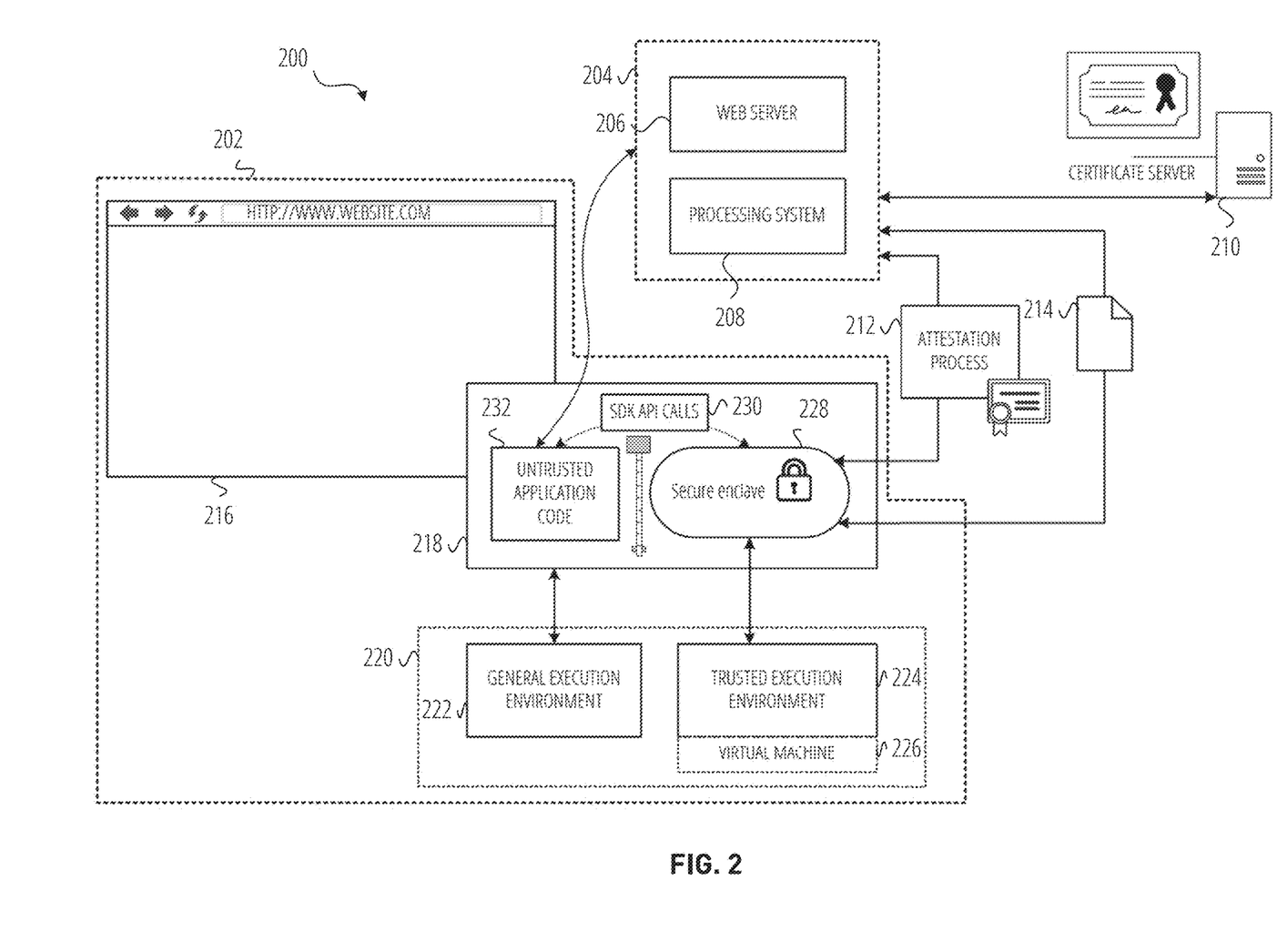
FIG. 2 is a graphical illustration of use of a trusted isolated execution environment on a client system, according to various examples.

FIG. 2 is a graphical illustration of use of a TEE on a client system, according to various examples. Diagram 200 illustrates browser application 218, client processing system 220, browser window 216 as part of client system 202. Diagram 200 further includes server system 204 with web server 206 and server processing system 208, and diagram 200 includes certificate server 210. Client processing system 220 includes general execution environment 222, trusted isolated execution environment 224, and virtual machine 226. In various examples, trusted isolated execution environment 224 is implemented using virtual machine 226. For example, the TEE is run within a virtual machine that is initiated for the purpose of memory and process isolation. In other examples, trusted isolated execution environment 224 runs directly on client processing system 220 without the use of a virtual machine.

Browser application 218 may be installed on client system 202 and be a web browser. Browser application 218 may include untrusted application code 232 which operates on general execution environment 222 as well as the ability to run code in secure enclave 228, which is executed on trusted isolated execution environment 224.

Server system 204 includes web server 206 and server processing system 208. Server processing system may execute the functions of web server 206 as well the functions for confirming the authenticity/identity of a trusted isolated execution environment. To execute a function, program code stored on a storage device may be loaded into a memory of server processing system 208 for execution. Portions of the program code may be executed in a parallel across multiple processing units (e.g., a core of a general-purpose computer processor, a graphical processing unit, an application specific integrated circuit, etc.) of server processing system 208. Execution of the code may be performed on a single device or distributed across multiple devices. In some examples, the program code may be executed on a cloud platform (e.g., MICROSOFT AZURE® and AMAZON EC2®) using shared computing infrastructure. In various examples, server processing system 208 may also include a general execution environment and trusted isolated execution environment.

Although generally discussed in the context of delivering webpages via the Hypertext Transfer Protocol (HTTP), other network protocols may be utilized by web server 206 (e.g., File Transfer Protocol, Telnet, Secure Shell, etc.). A user may enter in a uniform resource identifier (URI) into browser application 218 (e.g., the INTERNET EXPLORER® web browser by Microsoft Corporation or SAFARI® web browser by Apple Inc.) that corresponds to the logical location (e.g., an Internet Protocol address) of web server 206. In response, web server 206 may transmit a web page that is rendered on a display device of a client device (e.g., a mobile phone, desktop computer, etc.).

Additionally, web server 206 may enable a user to interact with one or more web applications provided in a transmitted web page. A web application may provide user interface (UI) components that are rendered on a display device of client system 202, such as within browser window 216. The user may interact (e.g., select, move, enter text into) with the UI components, and based on the interaction, the web application may update one or more portions of the web page. A web application may be executed in whole, or in part, locally on client system 202. The web application may populate the UI components with data from external sources or internal sources, in various examples.

Different web applications, as well as different parts of a web application, may have different data protection needs. For example, a news web application may not require or have a need to use a secure enclave, but medical or financial web applications may want to use the secure enclave 228 for storing data and calculating values that may appear within the web application.

The web application served from web server 206 may include a JavaScript (or other programming language) API call to initiate secure enclave 228 for use with the web application. Using software development kit (SDK) API calls 230 of client processing system 220, untrusted application code 232 may initialize secure enclave 228 with respect to secure enclave 228 on behalf of the web application. API calls may also be provided to add, retrieve, update, or delete data from secure enclave 228. However, untrusted application code 232 may only act a relay of the commands as untrusted application code 232 will have no visibility (due to physical restrictions and encryption) into the actual data being passed.

Communications between secure enclave 228 and web server 206 may be implemented in a number of configurations. In one configuration, secure enclave 228 may establish a direct secure communication channel with web server 206, separate from browser application 218. Secure enclave 228 may negotiate cryptographic keys and protocols directly with web server 206. Once the secure channel is established, web server 206 can transmit a data file 214 (e.g., a cookie) directly to secure enclave 228 over the secure channel. Secure enclave 228 may then store the cookie in protected memory of trusted isolated execution environment 224 isolated from untrusted application code 232. This minimizes exposure of the cookie to insecure components during transmission and storage. In various examples, secure enclave 228 may also re-encrypt the data with a key known only to the enclave before allowing the untrusted execution environment to store it on a disk. This may limit the retrieval of the persisted data to the same combination of persistence media and the CPU running the enclave.

In another configuration, web server 206 may transmit an encrypted cookie to untrusted application code 232. Untrusted application code 232 passes the encrypted cookie to secure enclave 228 using SDK API calls 230. Secure enclave 228 decrypts the cookie using a key shared with web server 206 during a prior attestation protocol. Secure enclave 228 may store the decrypted cookie in the protected memory of the secure enclave. When needed, secure enclave 228 retrieves and re-encrypts the cookie before passing it back to untrusted application code 232 for transmission back to web server 206. Additionally, secure enclave 228 may decrypt the cookie and perform calculations using data stored in the cookie. The resulting calculations may be passed back to untrusted application code 232 for presenting in browser window 216, according to various examples or transmitted back to web server 206.

A hybrid configuration may involve web server 206 performing remote attestation (e.g., attestation process 212) with secure enclave 228 to share cryptographic keys prior to sending any data for storing in secure enclave 228. Web server 206 then transmits the cookie encrypted with the shared keys to untrusted application code 232, which passes it to secure enclave 228. Secure enclave 228 may decrypt and store the cookie in the secure enclave using the keys shared during attestation. This configuration leverages attestation to share secrets while relying on untrusted application code 232 for transmission.

As part of initializing secure enclave 228, client system 202 may generate verification parameters derived from hardware-tied security key (e.g., such as hardware tied private key 112 provided by chip manufacturer 102 in FIG. 1) and transmit them to server system 204. The verification parameters may include a public key stored in trusted isolated execution environment 224, a hash of code stored in the trusted isolated execution environment 224, etc., all cryptographically signed with the hardware tied private key of trusted isolated execution environment 224.

In various examples, server system 204 establishes communication with certificate server 210 to have these verification parameters certified. For example, certificate server 210 may validate the authenticity of the verification parameters based on credentials received from a chip manufacturer at the time client processing system 220 was manufactured. After validating the verification parameters belong to trusted secure enclave 228, certificate server 210 may sign the verification parameters and issues an attestation certificate back to client system 202.

In various examples, when browser application 218 communicates data to web server 206, it provides the attestation certificate containing the signed verification parameters to web server 206 as part of remote attestation. Web server 206 verifies certificate server 210's signature on the attestation certificate and ensures the certificate is trusted. This validates that the verification parameters were certified by trusted certificate server 210.

If the signature and certificate are valid, web server 206 may consider secure enclave 228 authenticated based on the certified verification parameters. Web server 206 may then securely transmit sensitive data to secure enclave 228.

Figure 3:
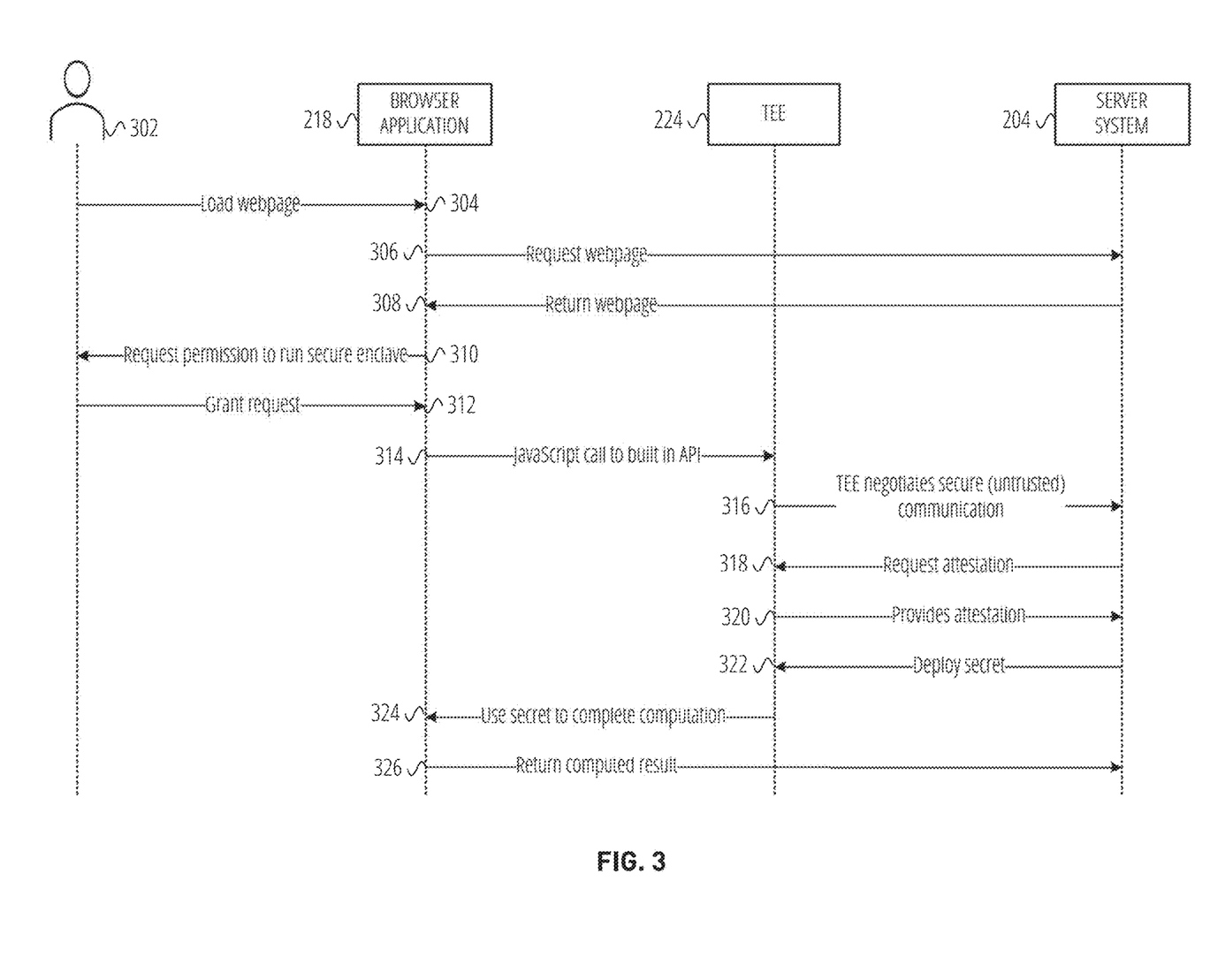
FIG. 3 is a swim lane diagram illustrating a method between a client system and a server system, according to various examples.

FIG. 3 is a swim lane diagram illustrating a method between a client system and a server system, according to various examples. The data is represented as a series of operations between user 302, browser application 218, trusted isolated execution environment 224, and server system 204. Browser application 218, trusted isolated execution environment 224, and server system 204 may perform additional operations as described with respect to FIG. 2. For example, browser application 218 and trusted isolated execution environment 224 may be part of a client system (e.g., client system 202).

At user 302, a user may enter in a URL into browser application 218 for accessing a webpage. At load operation 304, browser application 218, may transmit a request for the webpage to a server system, such as server system 204. The transmission may be performed using the general execution environment, like general execution environment 222, of the client system. For example, a web browser like Chrome or Firefox may send an HTTP GET request over the internet to retrieve a hosted webpage from a web server such as web server 206 of server system 204.

In response, at return webpage operation 308, the web server of server system 204 may transmit webpage code containing JavaScript API calls to initialize a secure enclave within the browser application 218. The requested webpage of webpage request operation 306 is received by browser application 218 from server system 204. The received webpage may include code that acts as a secure execution request, invoking the utilization of a secure enclave (e.g., secure enclave 228) within trusted isolated execution environment 224. The code make take the form of JavaScript code calls or API invocations requesting initialization of a secure enclave. For instance, SDK APIs 230 provided by a chip manufacturer could be leveraged by untrusted application code 232 to establish the enclave.

Prior to establishing the secure enclave, at permission request operation 310, the client system may present a permission request to the user (e.g., a message presented via browser application 218), asking for authorization to establish the enclave. At grant request operation 312. An indication of approval may be received at browser application 218 indicating user 302 has approved the secure enclave. This allows users to opt-in to the usage of the secure enclave capabilities. An indication may be a user clicking a button on the presented permission request.

In some examples, the permission request is specific to the website received. Thus, after approval, browser application 218 may have authorization to establish the secure enclave and use trusted isolated execution environment 224 for the webpage. However, other webpages may not be able to access the trusted isolated execution environment 224 unless additional authorization grants have been made by user 302. Furthermore, even if another website is able to use trusted isolated execution environment 224, the secure enclave established in response to grant request operation 312 would be inaccessible by those other webpages.

In response to the webpage's secure execution request instructions, a secure enclave may be established (API call operation 314) with respect to the requesting browser application 218 based on a JavaScript API call in the received webpage, for example. The secure enclave may be created within trusted isolated execution environment 224, which provides hardware-enforced memory protections. The browser application's untrusted code may use SDK APIs to initialize the enclave, keeping sensitive code and data shielded from the untrusted portions of browser application 218.

Once the secure enclave has been established, trusted isolated execution environment 224 may negotiate (e.g., using a secure socket layer certificate) with server system 204, at secure communication operation 316. In various examples, the secure communication channel may be established via a JavaScript API call mediated by the general execution environment (e.g., via untrusted application code 232). In this manner the entire code base within the trusted isolated execution environment 224 may be cryptographic.

Once the secure connection has been established, at request attestation operation 318, server system 204 may transmit a request for attestation of the secure enclave. This attestation request serves to verify the authenticity of the enclave and may be received within the trusted execution environment while it is executing. For example, server system 204 may transmit a message/challenge to trusted isolated execution environment 224.

At provide attestation operation 320, the trusted isolated execution environment may transmit an attestation response based on a physical property of a processing unit in the client system. For example, the attestation response may sign verification parameters, which are stored within trusted isolated execution environment 224 by the chip manufacture, using a hardware-tied security key, such as hardware tied private key 112. Trusted isolated execution environment 224 may also sign the message/challenge from request attestation operation 318. Additionally, trusted isolated execution environment 224 may generate a random nonce and include it with the response. This allows the secure enclave to produce a response that cryptographically proves its identity of a client system based on the hardware properties of the underlying processor. The verification parameters may include, for example, the cryptographically signed hashes of the contents of the secure enclave or previously received nonce values to prevent replay attacks.

Server system 204 may communicate with an external server in some examples to verify the received attestation. For example, the attestation may include a digitally signed certificate. The certificate may be verified using a certificate server such as certificate server 110 in various examples.

After the attestation process completes and the server system has cryptographically verified the authenticity of the secure enclave, server system 204 may transmit a "secret" data file to the enclave (e.g., at deploy secret operation 322). The transmission (as well as future transmissions) to the trusted isolated execution environment may be signed using the public key corresponding to the private key of the processor (e.g., private key 112 of client processing system 220). This data file may then be stored in the secure enclave for use in computations (e.g., computation operation 324) within trusted isolated execution environment 224. The secret may be a nonce value in some examples or a private key value. The data file may also be a cookie or value to generate a unique ID in various examples. Prior to using the data file, it may be decrypted using the private key of the trusted isolated execution environment (e.g., private key 112). In various examples, at operation 326, browser application 218 may transmit the computed response back to server system 204.

Banks and financial institutions frequently face threats from attackers attempting to gain unauthorized access to user accounts or orchestrate large-scale attacks against online banking systems. A bank may use a method such as described in FIG. 3 to mitigate these risks by utilizing a unique identifier cryptographically tied to the user's hardware that is generated within a secure enclave on the user's device.

For example, when a user attempts to login to their online bank account through the website, the bank's web server may transmit JavaScript code invoking the browser to establish a secure enclave and generate an attestation response to an attestation request. The attestation response may be signed using the public key corresponding to the hardware-linked private key of the trusted isolated execution environment of the user's device. This may allow the web server to verify the authenticity of the enclave using the signed response prior to transmitting sensitive data. Furthermore, the public key may act as unique ID that identifies that particular user's device—or in some instances the unique ID may be computed using the public key as a factor.

During login, the bank's web server may check that a secure enclave-generated ID (e.g., the public key) matches a previously registered value associated with the user's account. This match would confirm that the user is authenticating from a known, trusted device. If an account is accessed from an unknown device ID (e.g., a different public key or a different previously generated ID), the bank may flag this for further verification or block the access attempt. Similarly, if same unique ID is used for multiple user account logins in rapid succession, it may be an indicate that the requesting client server system is a bad actor and block requests from that particular generated ID.

Figure 4:
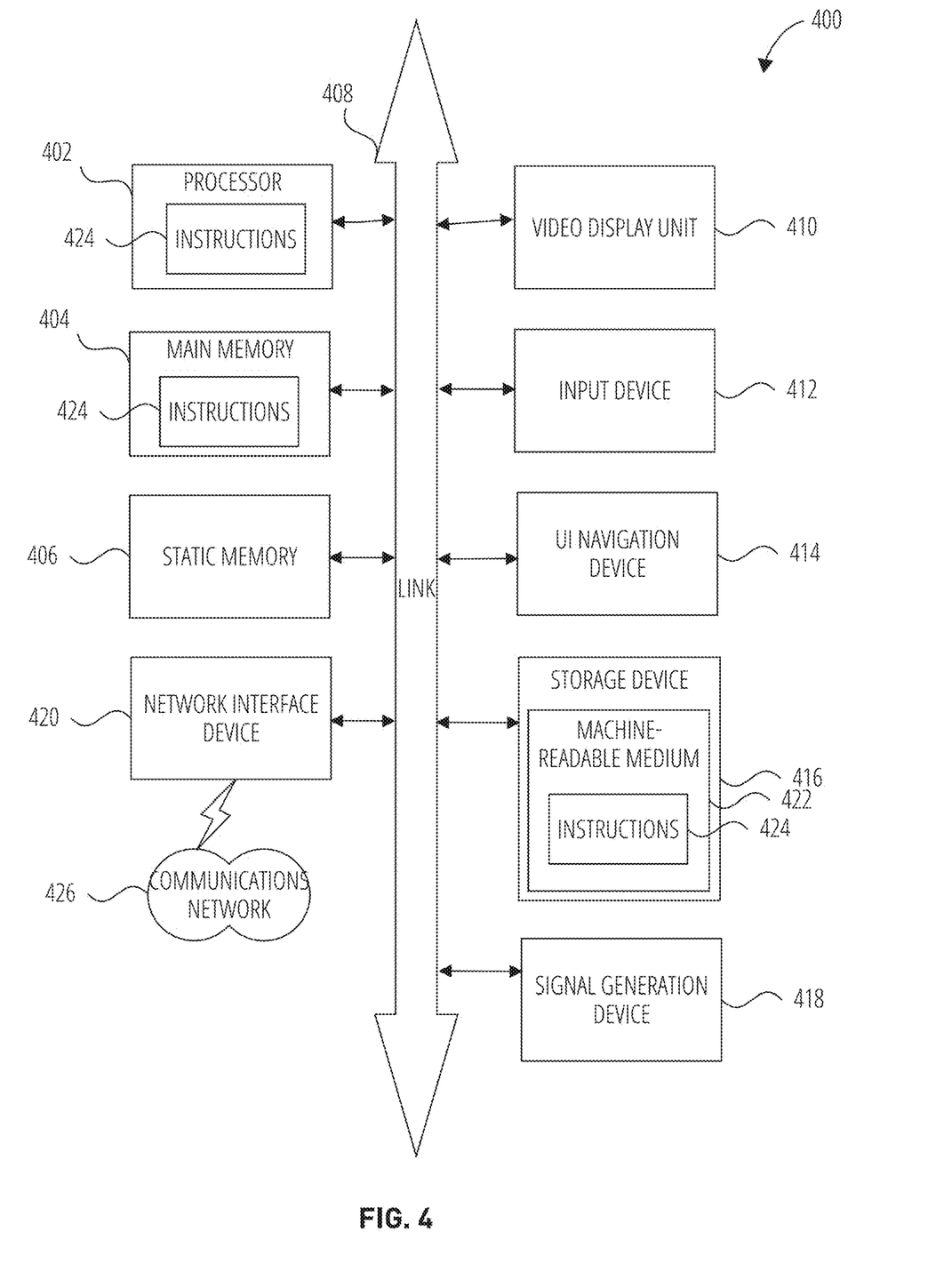
FIG. 4 is a block diagram illustrating a machine in the example form of computer system, within which a set or sequence of instructions may be executed to cause the machine to perform any one of the methodologies discussed herein, according to various examples.

FIG. 4 is a block diagram illustrating a machine in the example form of computer system 400, within which a set or sequence of instructions may be executed to cause the machine to perform any one of the methodologies discussed herein, according to an example embodiment. In alternative embodiments, the machine operates as a standalone device or may be connected (e.g., networked) to other machines. In a networked deployment, the machine may operate in the capacity of either a server or a client machine in server-client Network environments, or it may act as a peer machine in peer-to-peer (or distributed) Network environments. The machine may be an onboard vehicle system, wearable device, personal computer (PC), a tablet PC, a hybrid tablet, a personal digital assistant (PDA), a mobile telephone, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. Similarly, the term "processor-based system" shall be taken to include any set of one or more machines that are controlled by or operated by a processor (e.g., a computer) to individually or jointly execute instructions to perform any one or more of the methodologies discussed herein.

Example computer system 400 includes at least one processor 402 (e.g., a central processing unit (CPU), a graphics processing unit (GPU) or both, processor cores, compute nodes, etc.), a main memory 404 and a static memory 406, which communicate with each other via a link 408. The computer system 400 may further include a video display unit 410, an input device 412 (e.g., a keyboard), and a user interface UI navigation device 414 (e.g., a mouse). In one embodiment, the video display unit 410, input device 412, and UI navigation device 414 are incorporated into a single device housing such as a touch screen display. The computer system 400 may additionally include a storage device 416 (e.g., a drive unit), a signal generation device 418 (e.g., a speaker), a network interface device 420, and one or more sensors (not shown), such as a global positioning system (GPS) sensor, compass, accelerometer, or other sensors.

The storage device 416 includes a machine-readable medium 422 on which is stored one or more sets of data structures and instructions 424 (e.g., software) embodying or utilized by any one or more of the methodologies or functions described herein. The instructions 424 may also reside, completely or at least partially, within the main memory 404, static memory 406, and/or within the processor 402 during execution thereof by the computer system 400, with the main memory 404, static memory 406, and the processor 402 also constituting machine-readable media.

While the machine-readable medium 422 is illustrated in an example embodiment to be a single medium, the term "machine-readable medium" may include a single medium or multiple media (e.g., a centralized or distributed Database, and/or associated caches and servers) that store the one or more instructions 424. The term "machine-readable medium" shall also be taken to include any tangible medium that is capable of storing, encoding or carrying instructions for execution by the machine and that cause the machine to perform any one or more of the methodologies of the present disclosure or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks. A computer-readable storage device may be a machine-readable medium 422 that excluded transitory signals.

The instructions 424 may further be transmitted or received over a communications network 426 using a transmission medium via the network interface device 420 utilizing any one of a number of well-known transfer protocols (e.g., HTTP). Examples of communication networks include a local area Network (LAN), a wide area Network (WAN), the Internet, mobile telephone networks, plain old telephone (POTS) networks, and wireless data networks (e.g., Wi-Fi, 3G, and 4G LTE/LTE-A or WiMAX networks). The term "transmission medium" shall be taken to include any intangible medium that is capable of storing, encoding, or carrying instructions for execution by the machine, and includes digital or analog communications signals or other intangible medium to facilitate communication of such software.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, also contemplated are examples that include the elements shown or described. Moreover, also contemplated are examples using any combination or permutation of those elements shown or described (or one or more aspects thereof), either with respect to a particular example (or one or more aspects thereof), or with respect to other examples (or one or more aspects thereof) shown or described herein.

What is claimed is:

1. A method comprising:
 transmitting, from a browser application of a client system, a request for a webpage to a server system using a general execution environment of the client system;
 receiving the webpage, the webpage including a secure execution request to execute a computation in a trusted isolated execution environment of the client system;
 in response to the secure execution request, establishing a secure enclave within the trusted isolated execution environment with respect to the browser application;
 receiving, within the trusted isolated execution environment, an attestation request from the server system for an attestation associated with the secure enclave;
 transmitting, from the trusted isolated execution environment, an attestation response based on a physical property of a processing unit in the client system;
 subsequent to transmitting the attestation response, receiving, from the server system, a data file; and
 storing the data file in the secure enclave.

2. The method of claim 1, further comprising:
 prior to establishing the secure enclave:
  presenting a permission request on the client system for authorization to establish the secure enclave; and
  receiving an indication of a user approval of the permission.

3. The method of claim 1, wherein the attestation response includes a nonce value.

4. The method of claim 1, wherein the attestation response includes a cryptographically signed hash of the secure enclave.

5. The method of claim 4, further comprising:
 digitally signing the attestation response using a private key associated with the trusted isolated execution environment.

6. The method of claim 1, wherein the secure execution request is a JavaScript application programming interface call to the trusted isolated execution environment.

7. The method of claim 1, further comprising, subsequent to the establishing:
 executing, in the secure enclave associated with the browser, using the trusted isolated execution environment, the computation.

8. The method of claim 7, wherein the computation is encrypting or decrypting a cookie data file.

9. The method of claim 7, wherein the computation is generating a unique identifier.

10. The method of claim 9, further comprising:
 computing the unique identifier using the data file.

11. A non-transitory computer-readable medium comprising instructions, which when executed by a client system, configure the client system to perform operations comprising:
 transmitting, from a browser application of a client system, a request for a webpage to a server system using a general execution environment of the client system;
 receiving the webpage, the webpage including a secure execution request to execute a computation in a trusted isolated execution environment of the client system;
 in response to the secure execution request, establishing a secure enclave within the trusted isolated execution environment with respect to the browser application;
 receiving, within the trusted isolated execution environment, an attestation request from the server system for an attestation associated with the secure enclave;
 transmitting, from the trusted isolated execution environment, an attestation response based on a physical property of a processing unit in the client system;
 subsequent to transmitting the attestation response, receiving, from the server system, a data file; and
 storing the data file in the secure enclave.

12. The non-transitory computer-readable medium of claim 11, wherein the instructions, which when executed by the client system, further configure the client system to perform operations comprising:
 prior to establishing the secure enclave:
  presenting a permission request on the client system for authorization to establish the secure enclave; and
  receiving an indication of a user approval of the permission.

13. The non-transitory computer-readable medium of claim 11, wherein the attestation response includes a nonce value.

14. The non-transitory computer-readable medium of claim 11, wherein the attestation response includes a cryptographically signed hash of the secure enclave.

15. The non-transitory computer-readable medium of claim 14, wherein the instructions, which when executed by the client system, further configure the client system to perform operations comprising:
 digitally signing the attestation response using a private key associated with the trusted isolated execution environment.

16. The non-transitory computer-readable medium of claim 11, wherein the secure execution request is a JavaScript application programming interface call to the trusted isolated execution environment.

17. The non-transitory computer-readable medium of claim 11, wherein the instructions, which when executed by the client system, further configure the client system to perform operations comprising, subsequent to the establishing:
 executing, in the secure enclave associated with the browser, using the trusted isolated execution environment, the computation.

18. The non-transitory computer-readable medium of claim 17, wherein the computation is encrypting or decrypting a cookie data file.

19. The non-transitory computer-readable medium of claim 17, wherein the computation is generating a unique identifier.

20. A client system comprising:
 a general execution environment;
 a trusted isolated execution environment; and
 a storage device comprising instructions, which when executed by the client system, configure the client system to perform operations comprising:
  transmitting, from a browser application of a client system, a request for a webpage to a server system using a general execution environment of the client system;
  receiving the webpage, the webpage including a secure execution request to execute a computation in a trusted isolated execution environment of the client system;
  in response to the secure execution request, establishing a secure enclave within the trusted isolated execution environment with respect to the browser application;

receiving, within the trusted isolated execution environment, an attestation request from the server system for an attestation associated with the secure enclave;
transmitting, from the trusted isolated execution environment, an attestation response based on a physical property of a processing unit in the client system;
subsequent to transmitting the attestation response, receiving, from the server system, a data file; and
storing the data file in the secure enclave.

\* \* \* \* \*